(12) United States Patent
Cho et al.

(10) Patent No.: US 10,170,936 B2
(45) Date of Patent: Jan. 1, 2019

(54) WIRELESS POWER RECEIVER AND POWER SUPPLY APPARATUS USING THE SAME

(71) Applicant: SAMSUNG ELECTRO-MECHANICS CO., LTD., Suwon-si (KR)

(72) Inventors: Sang Ho Cho, Suwon-si (KR); Hugh Kim, Suwon-si (KR); Chul Gyun Park, Suwon-si (KR); Jae Suk Sung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 138 days.

(21) Appl. No.: 15/073,827

(22) Filed: Mar. 18, 2016

(65) Prior Publication Data

US 2017/0093216 A1  Mar. 30, 2017

(30) Foreign Application Priority Data

Sep. 25, 2015  (KR) .................. 10-2015-0136977

(51) Int. Cl.
| | | |
|---|---|---|
| *H02J 7/00* | (2006.01) | |
| *H02J 50/12* | (2016.01) | |
| *H02J 7/02* | (2016.01) | |
| *H01F 27/36* | (2006.01) | |
| *H01F 38/14* | (2006.01) | |

(52) U.S. Cl.
CPC ............ *H02J 50/12* (2016.02); *H01F 27/365* (2013.01); *H01F 38/14* (2013.01); *H02J 7/025* (2013.01)

(58) Field of Classification Search
CPC .. H02J 5/005; H02J 7/025; H02J 50/10; H02J 50/12; H02J 7/052
USPC .......................................................... 320/108
See application file for complete search history.

(56) References Cited

U.S. PATENT DOCUMENTS

| | | | | |
|---|---|---|---|---|
| 2006/0044104 | A1* | 3/2006 | Derks | H01F 27/292 336/229 |
| 2007/0119284 | A1* | 5/2007 | Gijs | H01F 10/131 83/53 |
| 2010/0259352 | A1* | 10/2010 | Yan | H01F 5/003 336/200 |
| 2011/0084652 | A1* | 4/2011 | Julstrom | H02J 7/025 320/108 |
| 2011/0248673 | A1* | 10/2011 | Aerts | H02J 7/025 320/108 |
| 2012/0007015 | A1* | 1/2012 | Kumura | C01G 49/0018 252/62.59 |
| 2012/0290022 | A1* | 11/2012 | Murtonen | A61N 1/3718 607/2 |
| 2013/0188803 | A1* | 7/2013 | Shaanan | H04R 5/033 381/74 |

(Continued)

FOREIGN PATENT DOCUMENTS

| | | |
|---|---|---|
| KR | 10-0806562 B1 | 2/2008 |
| KR | 10-2014-0011556 A | 1/2014 |
| KR | 10-2014-0067185 A | 6/2014 |

*Primary Examiner* — Paul Dinh
(74) *Attorney, Agent, or Firm* — NSIP Law

(57) ABSTRACT

A wireless power receiver included in a device, the wireless power receiver including a core part fixed to be adjacent to a surface of an internal part; a receiving coil wound around the core part; and a power circuit configured to provide power received from the receiving coil to the wearable device.

19 Claims, 7 Drawing Sheets

(56) References Cited

U.S. PATENT DOCUMENTS

| | | | |
|---|---|---|---|
| 2014/0015338 A1* | 1/2014 | Yoshino | H02J 5/005 307/104 |
| 2014/0070762 A1* | 3/2014 | Jenwatanavet | H02J 7/025 320/108 |
| 2015/0061402 A1* | 3/2015 | Ichikawa | H01F 38/14 307/104 |
| 2016/0094051 A1* | 3/2016 | Soar | H02J 5/005 307/9.1 |
| 2016/0293302 A1* | 10/2016 | Kakuda | H03H 7/0115 |
| 2017/0250466 A1* | 8/2017 | Schlaffer | H01Q 1/38 |

* cited by examiner

WIRELESS POWER RECEIVER AND POWER SUPPLY APPARATUS USING THE SAME

CROSS-REFERENCE TO RELATED APPLICATION(S)

This application claims the benefit under 35 U.S.C. § 119(a) of Korean Patent Application No. 10-2015-0136977, filed on Sep. 25, 2015 in the Korean Intellectual Property Office, the entire disclosure of which is incorporated herein by reference, for all purposes.

BACKGROUND

1. Field

The following description relates to a wireless power receiver and a power supply apparatus using the same.

2. Description of Related Art

In accordance with the development of wireless technology, non-contact wireless power charging technology capable of charging an electronic device even in a non-contact state has recently been developed.

However, wireless power transmitting technology according to the related art has a number of limiting requirements in order to smoothly perform the charging. That is, upon wirelessly transmitting and receiving the power, there are limits on a transmission distance, a position relationship between a transceiver, and the like.

That is, there is are a number of extant problems reducing the efficiency of wireless power charging that generally are addressed only in a case in which a wireless power receiver and a wireless power transmitter are positioned to be directly opposite each other and in parallel relation.

Meanwhile, wireless power charging technology tends to be applied to various portable devices. Therefore, there has been demand for wireless power charging technology capable of efficiently performing charging even in various device environments.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to one general aspect, a wireless power receiver included in a device includes: a core part fixed to be adjacent to a surface of an internal part; a receiving coil wound around the core part; and a power circuit configured to provide power received from the receiving coil to the device.

The receiving coil may be wound around the core part in a length direction of the internal part.

The wireless power receiver may further include a magnetic sheet attached to a surface of the internal part, wherein the core part is attached to a surface of the magnetic sheet.

The wireless power receiver may further include: a first magnetic sheet attached to a surface of the internal part; and a second magnetic sheet attached to an opposing surface from the surface of the internal part, wherein the core part may include: a first core attached to the first magnetic sheet; and a second core attached to the second magnetic sheet.

The wireless power receiver may further include a fixing part coupled to both ends of the core part and fixing the core part to be adjacent to the surface of the internal part.

A magnetic sheet may be attached to a surface of the fixing part.

The core part may have a cylindrical shape and be fixed in a width direction of the internal part by the fixing part.

According to another general aspect, a power supply apparatus includes: a battery configured to supply power to a device; a core part fixed to be adjacent to a surface of the battery; a receiving coil wound around the core part; and a power circuit configured to provide power received from the receiving coil to the battery.

The receiving coil may be wound around the core part in a length direction of the battery.

The power supply apparatus may further include a magnetic sheet attached to the surface of the battery, wherein the core part may be attached to a surface of the magnetic sheet.

The power supply apparatus may further include: a first magnetic sheet attached to the surface of the battery; and a second magnetic sheet attached to an opposing surface from the surface of the battery, wherein the core part may include: a first core attached to the first magnetic sheet; and a second core attached to the second magnetic sheet.

The power supply apparatus may further include a fixing part coupled to both ends of the core part and fixing the core part to be adjacent to the surface of the battery.

A magnetic sheet may be attached to a surface of the fixing part.

The core part may have a cylindrical shape and be fixed in a width direction of the battery by the fixing part.

According to another general aspect, an apparatus including a wireless power receiver includes: a substantially planar housing defining a receiving space therein; a substantially planar internal electronic component disposed within the receiving space; a core portion extending from a lateral edge of the internal electronic component; and, a receiving coil wound around the core portion.

The receiving coil may be disposed transverse to a plane defined by the housing.

The windings of the receiving coil may extend around the core portion substantially in parallel with a length direction of the internal electronic component.

The apparatus may further include a magnetic sheet interposed between the core portion and the lateral edge of the internal electronic component.

The apparatus may further include a fixing portion configured to affix the core portion and the receiving coil to a lateral edge of the internal electronic component.

The internal electronic component may include a battery.

Other features and aspects will be apparent from the following detailed description, the drawings, and the claims.

BRIEF DESCRIPTION OF THE DRAWINGS

The above and other aspects, features, and advantages of the present disclosure will be more clearly understood from the following detailed description taken in conjunction with the accompanying drawings, in which.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
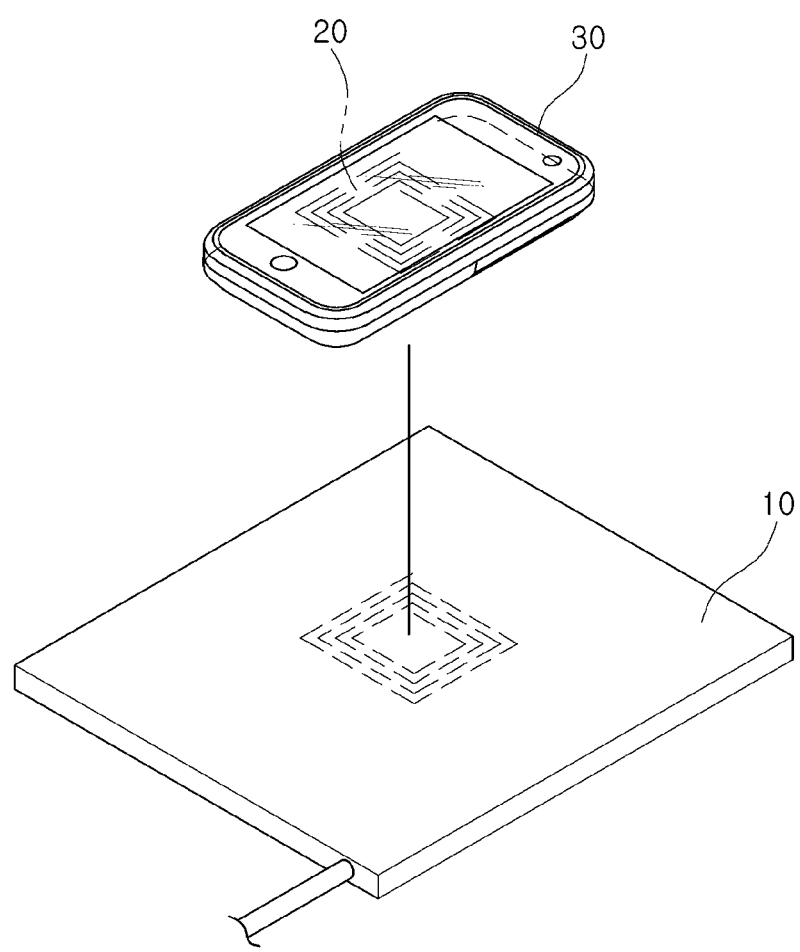
FIG. 1 is a diagram illustrating an example of a wireless power receiver used for a flat electronic device and a wireless power transmitter.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the example embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein is for describing particular embodiments only and is not intended to be limiting. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present inventive concept will be described with reference to schematic views illustrating embodiments. In the drawings, for example, due to manufacturing techniques and/or tolerances, modifications of the shape shown may be estimated. Thus, embodiments should not be construed as being limited to the particular shapes of regions shown herein, but should, for example, be understood to include a change in shape resulting from manufacturing. The following embodiments may also be constituted by one or a combination thereof.

FIG. 1 is a diagram illustrating an example of a wireless power receiver used for a flat electronic device and a wireless power transmitter.

In the example illustrated in FIG. 1, a wireless power receiver 20 connected to a smartphone 30, wirelessly receives power from a wireless power transmitter 10, and provides the power to the smartphone 30.

The wireless power receiver 20 is positioned on a cover of the smartphone 30. Thus, the wireless power receiver 20 performs charging with the wireless power transmitter 10. That is, a receiving coil of the wireless power receiver 20 is set to be in parallel to a transmitting coil of the wireless power transmitter 10.

Thus, in the case of the illustrated example, the wireless power receiver 20 may be formed on the cover of the smartphone 30, or the like, and may easily receive power from the receiving coil wound in a planar shape.

Because a wireless power receiver used for a wearable device should be miniaturized to the extent that it may be applied to wearable devices and a space for the receiving coil needs to also be secured in the miniaturized structure, the wireless power receiver for wearable devices has requirements different from those of the wireless power receiver of FIG. 1 described above.

Hereinafter, a wireless power receiver according to various embodiments will be described with reference to FIGS. 2 through 10.

Figure 2:
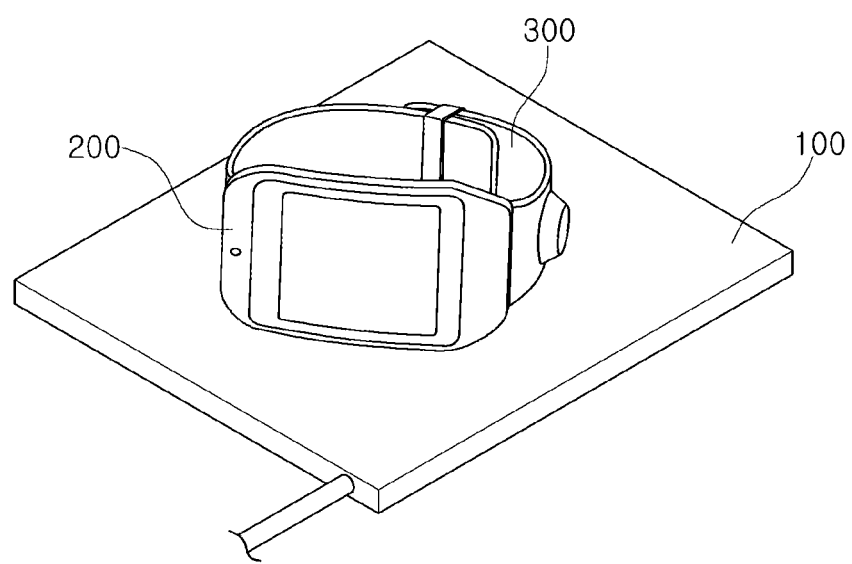
FIG. 2 is a diagram illustrating an example of a wireless power receiver used for a wearable device and a wireless power transmitter, according to an embodiment.

FIG. 2 is a diagram illustrating an example of a wireless power receiver used for a wearable device and a wireless power transmitter, according to an embodiment.

In the example illustrated in FIG. 2, as an example of a wearable device, a smart watch 300 is illustrated, but is merely illustrative. The wireless power receiver 200 may be used for various electronics devices such as wearable devices.

The wireless power receiver 200 is included in the smart watch 300.

When the smart watch 300 is positioned on the wireless power transmitter 100, the wireless power transmitter 100 and a body part of the smart watch 300 have a tendency to be positioned perpendicular to each other. That is, as in the illustrated example, the wireless power transmitter 100 and the body part of the smart watch 300 tend to be positioned so as not to be in parallel with each other.

In the case in which the smart watch 300 is positioned as in the illustrated example, if a coil of the wireless power receiver 200 is formed to be in parallel with the body part of the smart watch 300, the coil of the wireless power receiver 200 and a coil of the wireless power transmitter 100 are perpendicular to each other. Magnetic coupling force between two coils which are perpendicular to each other is generally relatively weak. Thus, in this case, it may be very difficult to perform wireless charging, or a time required to perform the charging will generally be increased.

Thus, the following description provides various example embodiments in which the wireless charging may be stably performed even in an environment in which the wearable device 300 housing the wireless power receiver 200 is positioned to have a predetermined non-parallel angle with the wireless power transmitter 100 as described above.

That is, according to various embodiments, the wireless charging may be efficiently performed even in various wearable devices by forming a receiving coil of the wireless power receiver 200 such as in embodiments illustrated in FIGS. 4 through 10 to be described below.

Figure 3:
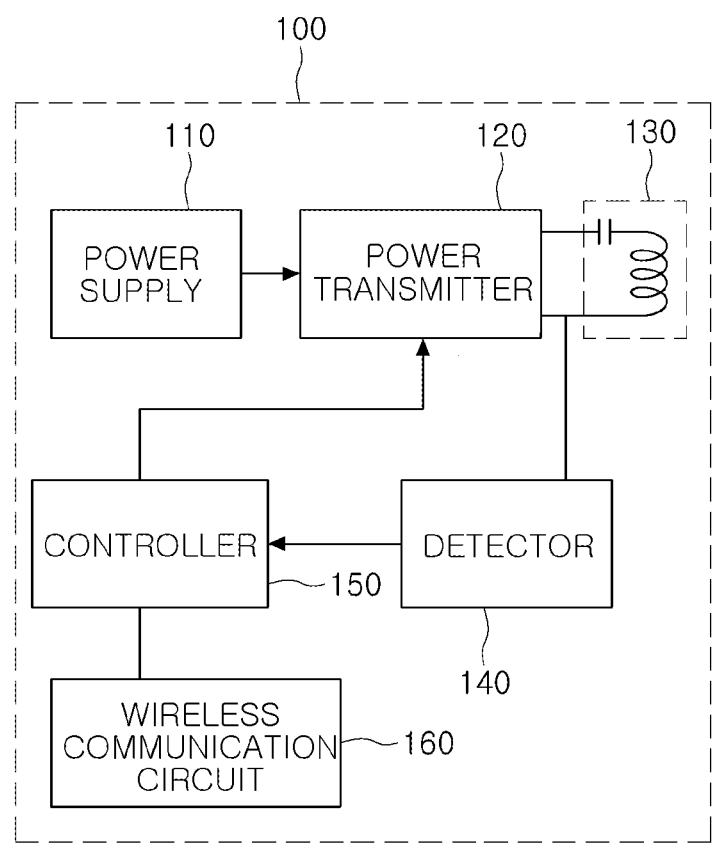
FIG. 3 is a block diagram illustrating a wireless power transmitter according to an embodiment.

FIG. 3 is a block diagram illustrating a wireless power transmitter according to an example embodiment.

Referring to FIG. 3, a wireless power transmitter 100 includes a power supply 110, a power transmitter 120, a resonator 130, a detector 140, and a controller 150. According to an embodiment, the wireless power transmitter 100 further includes a wireless communication circuit 160.

The power supply 110 supplies power to the components of the wireless power transmitter 100. For example, the power supply 110 is a power supplying module receiving and converting commercial alternating current (AC) power into a plurality of direct current (DC) powers having various voltage levels and providing the converted direct current (DC) powers.

The power transmitter 120 is connected to a transmitting coil of the resonator 130 and provides current to the transmitting coil. For example, the power transmitter 120 includes an amplifying circuit including a plurality of switches. The amplifying circuit provides the current to the transmitting coil by switching operations for the plurality of switches.

The resonator 130 includes the transmitting coil. The transmitting coil is magnetically coupleable to the receiving coil of the wireless power receiver 200 and wirelessly transmits power.

Here, the magnetic coupling made between the transmitting coil and the receiving coil is not limited to a particular manner. For example, the transmitting coil and the receiving coil may be magnetically coupled to each other in an electromagnetic inductive coupling manner. As another example, the transmitting coil and the receiving coil may also be magnetically coupled to each other in a magnetic resonance manner.

The detector 140 detects a sensing voltage from a current flowing in the transmitting coil. The controller 150 determines a change in impedance of the transmitting coil using a variation of the sensing voltage. If the change in the impedance occurs, the controller 150 determines whether or not the wireless power receiver 200 is adjacent to the wireless power transmitter 100.

The illustrated example illustrates a case in which the detector 140 senses the current flowing in the transmitting coil, but this is merely illustrative. Thus, according to an embodiment, the detector 140 may be variously modified, such as detecting an input voltage of the power transmitter 120, and the like.

The controller 150 controls an operation of the power transmitter 120.

For example, the controller 150 controls the power transmitter 120 to transmit a beacon signal. A beacon signal collectively refers to a signal used to identify whether or not the wireless power receiver is adjacent or to identify whether or not the wireless charging may be performed.

Thereafter, the controller 150 controls the power transmitter 120 to wirelessly transmit the power.

The controller 150 may include a processor. Depending on the example embodiments, the controller 150 may further include a memory. Here, the processor may include, for example, a central processing unit (CPU), a graphics processing unit (GPU), a microprocessor, an application specific integrated circuit (ASIC), field programmable gate arrays (FPGA), and the like, and may have a plurality of cores. The memory may be a volatile memory (e.g., RAM, or the like), a non-volatile memory (e.g., a ROM, a flash memory, or the like), or a combination thereof.

The wireless communication circuit 160 forms a short-range wireless communications line with the wireless power receiver 200. For example, the wireless communication circuit 160 forms the short-range wireless communications line with the wireless power receiver 200 in a BLUETOOTH®, WiFi®, or Near Field Communication (NFC), in-band modulation, or other suitable short-range wireless manner. Depending on the embodiments, the controller 150 transmits and receives information for the charging to and from the wireless power receiver through the wireless communication circuit 160.

Figure 4:
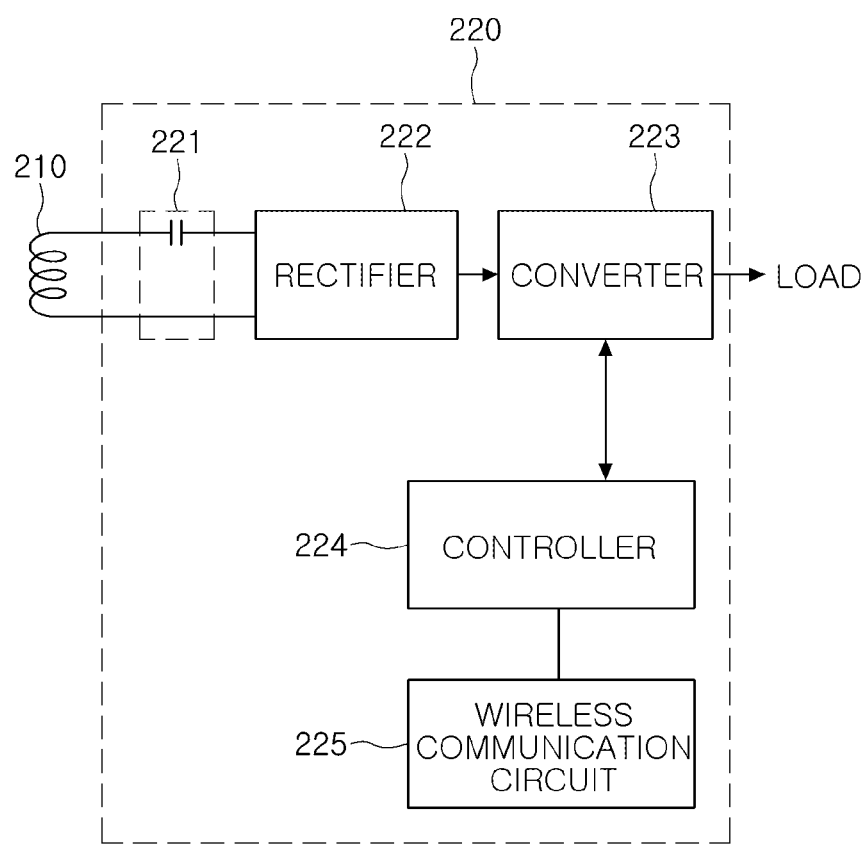
FIG. 4 is a block diagram illustrating a wireless power receiver according to an embodiment.

FIG. 4 is a block diagram illustrating a wireless power receiver according to an embodiment.

A wireless power receiver 200 includes a receiving coil 210 and a power circuit 220 providing power received from the coil to the wearable device.

The power circuit 220 includes a resonator 221, a rectifier 222, a converter 223, and a controller 224. Depending on the embodiments, the power circuit 220 further includes a wireless communication circuit 225.

The resonator 221 includes a resonance circuit connected to the receiving coil 210. The resonator 221 is magnetically coupleable to the resonator 130 of the wireless power transmitter to wirelessly receive the power.

The power received by the resonator 221 is rectified by the rectifier 222 and converted by the converter 223 to be provided to the wearable device, such as a battery of the wearable device.

The controller 224 controls an operation of the rectifier 222 and/or the converter 223.

The controller 224 may include a processor. Depending on the embodiments, the controller 224 may further include a memory. Here, the processor may include, for example, a central processing unit (CPU), a graphics processing unit (GPU), a microprocessor, an application specific integrated circuit (ASIC), field programmable gate arrays (FPGA), and the like, and may have a plurality of cores. The memory may be a volatile memory (e.g., RAM, or the like), a non-volatile memory (e.g., a ROM, a flash memory, or the like), or a combination thereof.

Depending on the example embodiments, the controller 224 may also be implemented as a controller of the wearable device.

In the case of an embodiment including the wireless communication circuit 250, the controller 224 performs communications for the power transmission with the wireless power transmitter 100 using the wireless communication circuit 250. Depending on the embodiments, the wireless communication circuit 250 may be included in the wearable device.

In a case in which the transmitting coil and the receiving coil are in parallel with each other, efficiency of a magnetic coupling between the transmitting coil and the receiving coil is generally at the substantially highest level. As a tilt angle is increased away from a parallel relation, efficiency of the magnetic coupling is decreased. Thus, since a wearable device according to the related art has a large angle formed by the receiving coil and the transmitting coil, there is a problem in that efficiency of the magnetic coupling is low.

Hereinafter, various embodiments of a receiving coil which may efficiently have a magnetic coupling even in the wearable device and may be applied to the present disclosure will be described.

Figure 5:
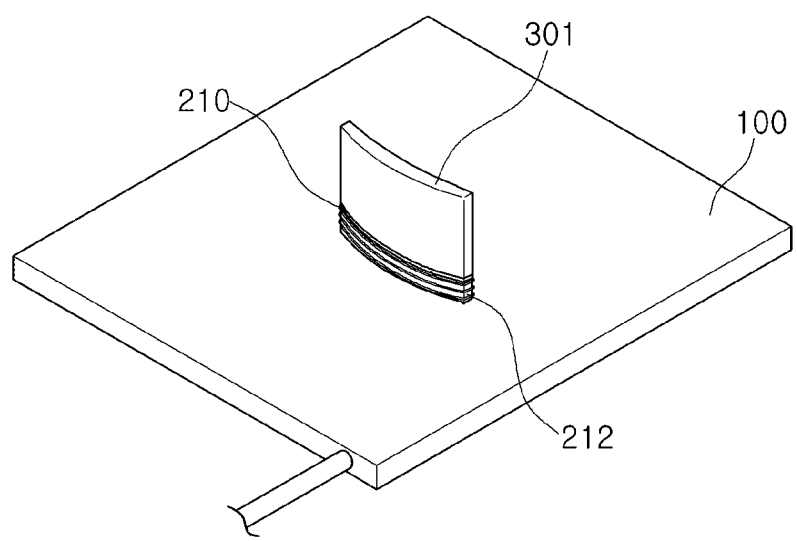
FIG. 5 is a perspective view illustrating an example of a receiving coil according to an embodiment.

FIG. 5 is a perspective view illustrating an example of a receiving coil according to an embodiment.

Referring to FIG. 5, a core part 212 may be fixed to be adjacent to and extending from one surface, such as a lateral side, of an internal part 301 (such as an internal electronic component) of the wearable device. The receiving coil 210 is wound around the core part 212.

The internal part 301 is included in a body of the wearable device. According to an embodiment, the internal part 301 is a battery supplying power to the wearable device.

According to an embodiment, the internal part 301 is a polyhedron having a length in one direction longer than that in the other direction. Here, one direction is referred to as a length direction and a direction perpendicular to the length direction is referred to as a width direction.

In the case of the illustrated example, the internal part 301 is a battery of a curved hexahedral shape in which a horizontal direction is the length direction. In the illustrated example, the core part 212 is fixed to be attached to a lower surface of the battery, and the receiving coil 210 is wound around the core part 212 in the length direction of the internal part 301. Thus, the receiving coil 210 and the transmitting coil in the wireless power transmitter 100 are positioned to be substantially parallel with each other or at approximately a horizontal or small angle.

This is because the wearable device may be laid in the length direction as illustrated when being positioned on the wireless power transmitter 100, in the case in which the internal part 301 is the polyhedron having the length in one direction longer than that in the other direction. That is, in the case in which the internal part 301 is the polyhedron having the length in one direction longer than that in the other direction, the wearable device may also have a shape of which a length in one direction is longer than that in the other direction. Thus, since standing the wearable device is unstable as long as the wearable device does not have a separate structure, the wearable device may be laid in the length direction.

Thus, the receiving coil 210 wound in the length direction of the internal part 301 and the transmitting coil in the wireless power transmitter 100 are positioned to be parallel with each other or at approximately a horizontal angle.

Figure 6:
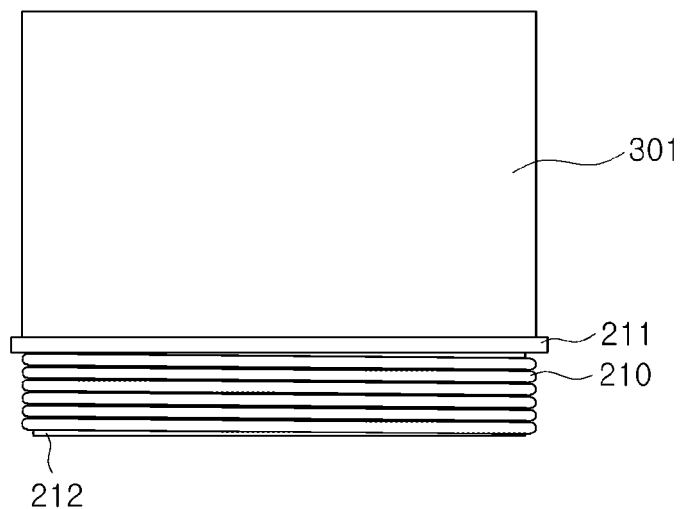
FIG. 6 is a front view illustrating a wireless power transmitter according to an embodiment.
Figure 7:
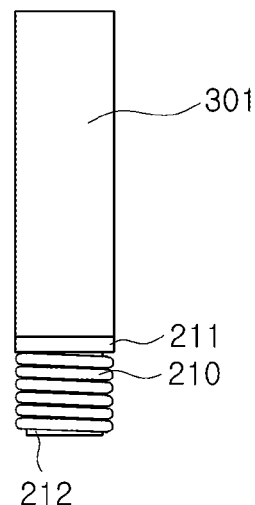
FIG. 7 is a side view of the wireless power transmitter illustrated in FIG. 6.

FIG. 6 is a front view illustrating a wireless power transmitter according to an embodiment, and FIG. 7 is a side view of FIG. 6.

As illustrated in FIGS. 6 and 7, the core part is fixed to be adjacent to at least one surface of the internal part 301, and the receiving coil 210 is wound around the core part 212. According to an embodiment, the wireless power transmitter further includes a magnetic sheet 211.

The magnetic sheet 211 is attached to one surface of the internal part 301. The core part 212 is attached to one surface of the magnetic sheet 211. For example, one surface of the magnetic sheet 211 is in contact with the internal part 301 to be fixed, and the other surface of the magnetic sheet 211 is in contact with the core part 212 to be fixed.

The magnetic sheet 211 and the core part 212 may be formed of a material having a predetermined magnetism. For example, the magnetic sheet 211 and the core part 212 may be formed of a resin material including metal powders. As another example, the magnetic sheet 211 and the core part 212 may be formed of a ferrite sheet (which may include NiZnCu/MnZn based metal), a sendust based metal, a permalloy based metal, an amorphous based magnetic body, or a combination thereof.

The illustrated magnetic sheet 211 serves as a passage through which a magnetic field formed by the receiving coil 210 flows. Thus, even though the internal part 301 is an object having insulation such as a battery, or the like, the magnetic field formed by the receiving coil 210 may flow through the magnetic sheet 211. While the core part 212 and magnetic sheet 211 are shown as two separate units, in some embodiments, the two may be formed together as one part, for example, forming a T-shape.

Figure 8:
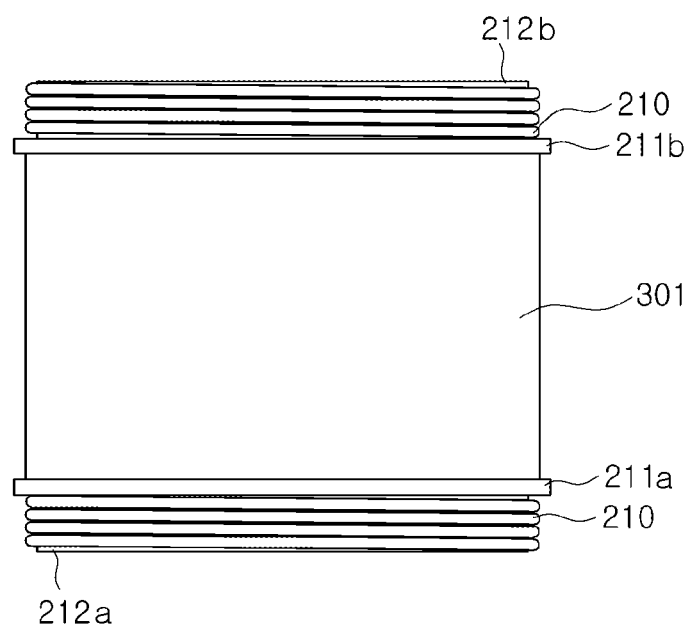
FIG. 8 is a front view illustrating a wireless power transmitter according to another embodiment.
Figure 9:
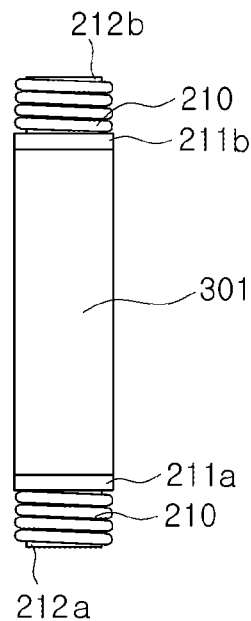
FIG. 9 is a side view of the wireless power transmitter illustrated in FIG. 8.

FIG. 8 is a front view illustrating a wireless power transmitter according to another embodiment, and FIG. 9 is a side view of FIG. 8.

As in examples illustrated in FIGS. 8 and 9, the core part has two or more cores 212a and 212b.

A first magnetic sheet 211a is attached to one surface of the internal part 301, and a second magnetic sheet 211b is attached to the other surface of the internal part 301 (i.e., a surface opposing one surface of the internal part 301).

The core part includes a first core 212a and a second core 212b. The first core 212a is attached to the first magnetic sheet 211a, and the second core 212b is attached to the second magnetic sheet 211b.

The transmitting coil 210 is wound around the first core 212a and the second core 212b in the length direction of the internal part 301.

Although not illustrated, in order to wind the transmitting coil 210 around both the first core 212a and the second core 212b, the transmitting coil 210 is wound around the internal part 301.

Figure 10:
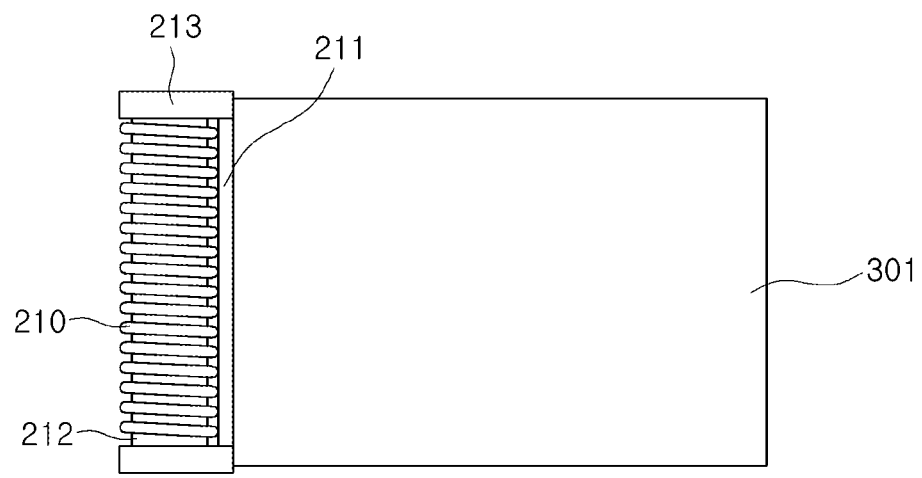
FIG. 10 is a front view illustrating a wireless power transmitter according to another embodiment.

FIG. 10 is a front view illustrating a wireless power transmitter according to another embodiment.

An embodiment illustrated in FIG. 10 further includes a fixing part 213 fixing the core part 212.

The fixing part 213 is fixed to one surface of the internal part 301 to fix the core part 212 to be adjacent to one surface of the internal part 301.

The fixing part 213 is formed of a non-conductive material. For example, the fixing part 213 may not be formed of a magnetic body, a metallic material, or the like, and may instead be formed of an insulating material, such as insulating plastic, or the like. When the fixing part 213 includes a conductive material, magnetic flux is influenced by the fixing part 213, which may disturb a linkage of the magnetic flux with the coil.

In the illustrated example, the fixing part 213 has a structure coupled to both ends of the core part 212, but this is merely illustrative. Thus, the fixing part 213 is coupled to only one end of the core part 212, or may also be configured integrally with the core part 212, where some regions of the fixing part 213 configure the core part 212.

According to an embodiment, the magnetic sheet 211 is attached to one surface of the fixing part 213. The magnetic sheet 211 is attached to one surface of the fixing part 213 so as to be positioned at a region between the core part 212 and the internal part 301.

The core part 212 is formed in a cylindrical shape. The core part 212 is fixed in the width direction of the internal part 301 by the fixing part 213.

The receiving coil 210 is wound around the core part 212.

Even in a case in which the core part 212 is formed to be extended in the width direction of the internal part 301 as illustrated, the receiving coil 210 is wound in the length direction of the internal part 301.

As described in FIGS. 4 through 10, according to various embodiments, the receiving coil 210 and the transmitting coil of the wireless power transmitter 100 are disposed in substantially parallel relation with each other, or may be disposed at an angle within a predetermined angle from a horizontal surface.

Thus, magnetic coupling force between the receiving coil 210 and the transmitting coil of the wireless power transmitter 100 may be enhanced. As a result, the wearable device may efficiently and wirelessly transmit or receive the power. Further, since the receiving coil 210 and the transmitting coil of the wireless power transmitter 100 may have the stronger magnetic coupling force, a degree of freedom for a charging distance may also be increased.

Although the wireless power receiver is described as an apparatus distinct from the wearable device in the above-mentioned description, the wireless power receiver may be implemented as one configuration of the wearable device according to the embodiments.

According to an embodiment, the wireless power receiver may be one configuration of a power supply apparatus of the wearable device. According to the embodiment described above, the power supply apparatus includes a battery (internal part) in the wearable device supplying the power to the wearable device, a receiving coil wound around the outside of the battery, and a power circuit providing power received from the receiving coil to the battery. Further, the various embodiments described with reference to FIGS. 4 through 10 may also be applied to the above-mentioned wireless power receiver.

As a non-exhaustive example only, a wearable smart device may be a ring, a watch, a pair of glasses, a bracelet, an ankle bracelet, a belt, a necklace, an earring, a headband, a helmet, a device embedded in clothing, an MP3 player, a portable/personal multimedia player (PMP), a sensor, or the like. In one example, a wearable device is a device that is designed to be mountable directly on the body of the user, such as a pair of glasses or a bracelet. In another example, a wearable device is any device that is mounted on the body of the user using an attaching device, such as an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

As set forth above, according to example embodiments, the wireless power receiver may efficiently perform the wireless charging even in the wearable device.

What is claimed is:

1. A wireless power receiver of a wearable device, the wireless power receiver comprising:
   a core part disposed in the wearable device to be adjacent to a surface of an internal part of the wearable device;
   a magnetic sheet disposed in the wearable device between the core part and the surface of the internal part;
   a receiving coil disposed in the wearable device and wound around the core part; and
   a power circuit configured to provide power received from the receiving coil to the wearable device.

2. The wireless power receiver of claim 1, wherein the receiving coil is wound around the core part in a length direction of the internal part.

3. The wireless power receiver of claim 1, wherein the magnetic sheet is attached to the surface of the internal part, and the core part is attached to a surface of the magnetic sheet.

4. The wireless power receiver of claim 1, further comprising:
   another core part disposed in the wearable device to be adjacent to another surface of the internal part; and
   another magnetic sheet disposed in the wearable device between the other core part and the other surface of the internal part.

5. The wireless power receiver of claim 1, further comprising a fixing part coupled to ends of the core part and fixing the core part to be adjacent to the surface of the internal part.

6. The wireless power receiver of claim 5, wherein the magnetic sheet is attached to a surface of the fixing part.

7. The wireless power receiver of claim 5, wherein the core part has a cylindrical shape and is fixed in a width direction of the internal part by the fixing part.

8. A power supply apparatus of a wearable device, the power supply apparatus comprising:
   a battery configured to supply power to the wearable device;
   a core part disposed in the wearable device to be adjacent to a surface of the battery;
   a magnetic sheet disposed in the wearable device between the core part and the surface of the battery;
   a receiving coil disposed in the wearable device and wound around the core part; and
   a power circuit configured to provide power received from the receiving coil to the battery.

9. The power supply apparatus of claim 8, wherein the receiving coil is wound around the core part in a length direction of the battery.

10. The power supply apparatus of claim 8, wherein the magnetic sheet is attached to the surface of the battery, and the core part is attached to a surface of the magnetic sheet.

11. The power supply apparatus of claim 8, further comprising:
   another core part disposed in the wearable device to be adjacent to another surface of the battery; and
   another magnetic sheet disposed in the wearable device between the other core part and the other surface of the battery.

12. The power supply apparatus of claim 8, further comprising a fixing part coupled to ends of the core part and fixing the core part to be adjacent to the surface of the battery.

13. The power supply apparatus of claim 12, wherein the magnetic sheet is attached to a surface of the fixing part.

14. The power supply apparatus of claim 12, wherein the core part has a cylindrical shape and is fixed in a width direction of the battery by the fixing part.

15. A wearable apparatus, comprising:
   a substantially planar housing defining a receiving space therein;
   a substantially planar internal electronic component disposed within the receiving space; and
   a wireless power receiver comprising
      a core portion disposed in the receiving space and extending from a lateral edge of the internal electronic component,
      a magnetic sheet disposed in the receiving space between the core portion and the lateral edge of the internal electronic component, and
      a receiving coil disposed in the receiving space and wound around the core portion.

16. The wearable apparatus of claim 15, wherein the receiving coil is disposed transverse to a plane defined by the housing.

17. The wearable apparatus of claim 15, wherein windings of the receiving coil extend around the core portion substantially in parallel with a length direction of the internal electronic component.

18. The wearable apparatus of claim 15, further comprising a fixing portion configured to affix the core portion and the receiving coil to the lateral edge of the internal electronic component.

19. The wearable apparatus of claim 15, wherein the internal electronic component comprises a battery.

* * * * *